US010251148B2

(12) United States Patent
Collet et al.

(10) Patent No.: US 10,251,148 B2
(45) Date of Patent: Apr. 2, 2019

(54) METHOD FOR LOCATING A TERMINAL CONNECTED TO A CELLULAR TELECOMMUNICATIONS NETWORK

(71) Applicant: ORANGE, Paris (FR)

(72) Inventors: Yann Collet, Issy les Moulineaux (FR); Stephane Bandin, Caen (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/974,153

(22) Filed: Dec. 18, 2015

(65) Prior Publication Data
US 2016/0192316 A1 Jun. 30, 2016

(30) Foreign Application Priority Data

Dec. 24, 2014 (FR) ...................................... 14 63338

(51) Int. Cl.
H04W 64/00 (2009.01)
G01S 5/02 (2010.01)
H04W 8/24 (2009.01)

(52) U.S. Cl.
CPC ............. H04W 64/00 (2013.01); G01S 5/021 (2013.01); H04W 8/24 (2013.01)

(58) Field of Classification Search
CPC .................................................... H04W 64/00
USPC ................................ 455/456.1, 456.2, 456.3
See application file for complete search history.

(56) References Cited

U.S. PATENT DOCUMENTS

| 2003/0119524 | A1 | 6/2003 | Carlsson | |
| 2005/0070223 | A1* | 3/2005 | Camp, Jr. | G01S 19/256 455/13.2 |
| 2007/0281712 | A1* | 12/2007 | Povey | H04W 64/00 455/456.1 |
| 2010/0178931 | A1* | 7/2010 | Busropan | H04W 64/00 455/456.1 |
| 2011/0051665 | A1* | 3/2011 | Huang | G01S 5/0027 370/328 |
| 2012/0295641 | A1 | 11/2012 | Tsuda | |

FOREIGN PATENT DOCUMENTS

WO 99/62284 A2 12/1999

OTHER PUBLICATIONS

Search Report issued in related application FR 14 63338, dated Nov. 17, 2015, 2 pages.

* cited by examiner

Primary Examiner — Muthuswamy G Manoharan
(74) Attorney, Agent, or Firm — Drinker Biddle & Reath LLP

(57) ABSTRACT

A method for locating a terminal equipped with a UICC card, connected to a cellular telecommunications network and located in a current cell, the terminal storing in the UICC card an identifier of the current cell and at least one identifier of a previous cell in which the terminal was previously located. This method comprises the following steps, implemented by a processing server connected to the network: receiving said identifiers received from the terminal via the communication network; estimating location information for the terminal using location coordinates associated with at least one previous cell identified by an identifier stored in the terminal.

13 Claims, 6 Drawing Sheets

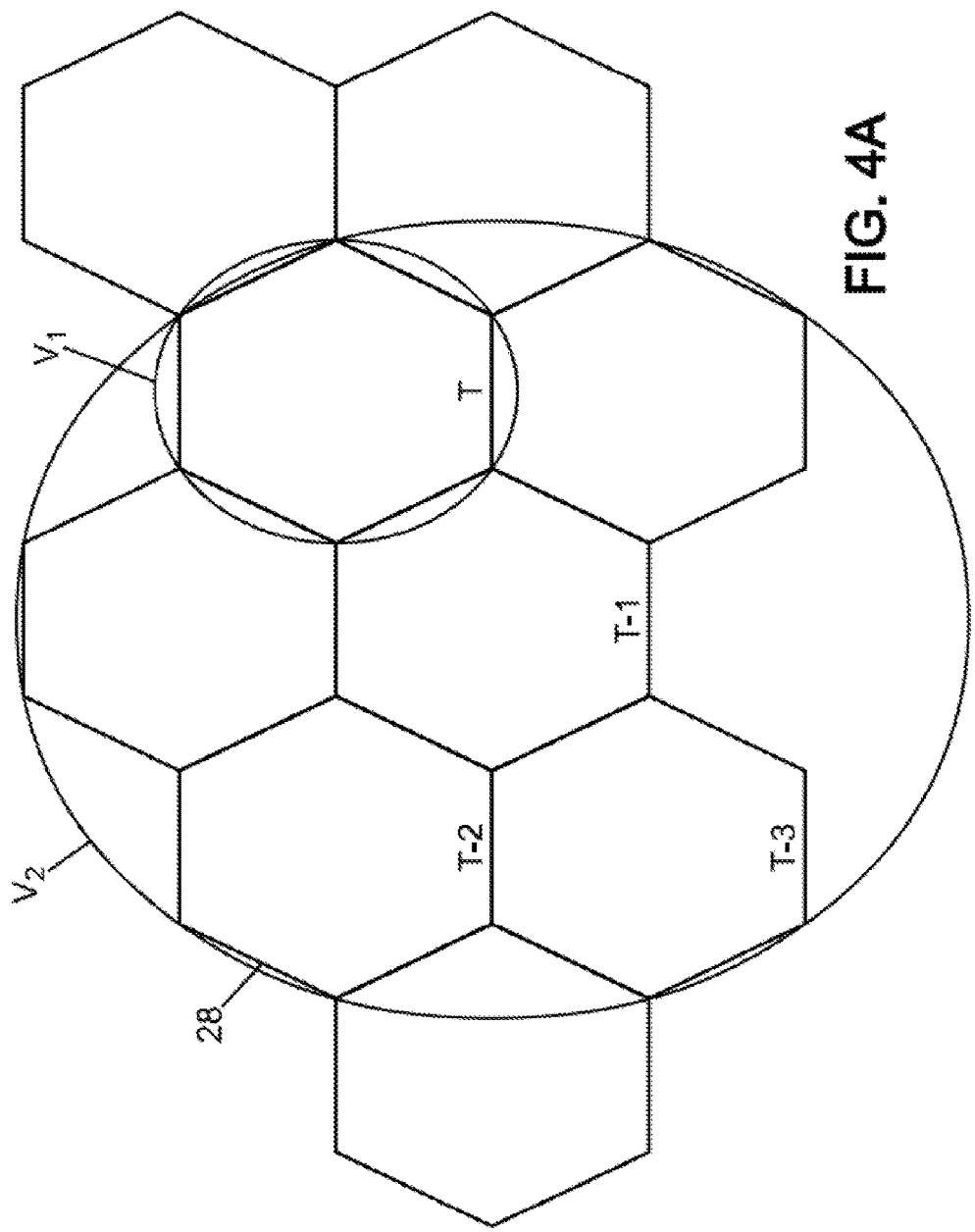

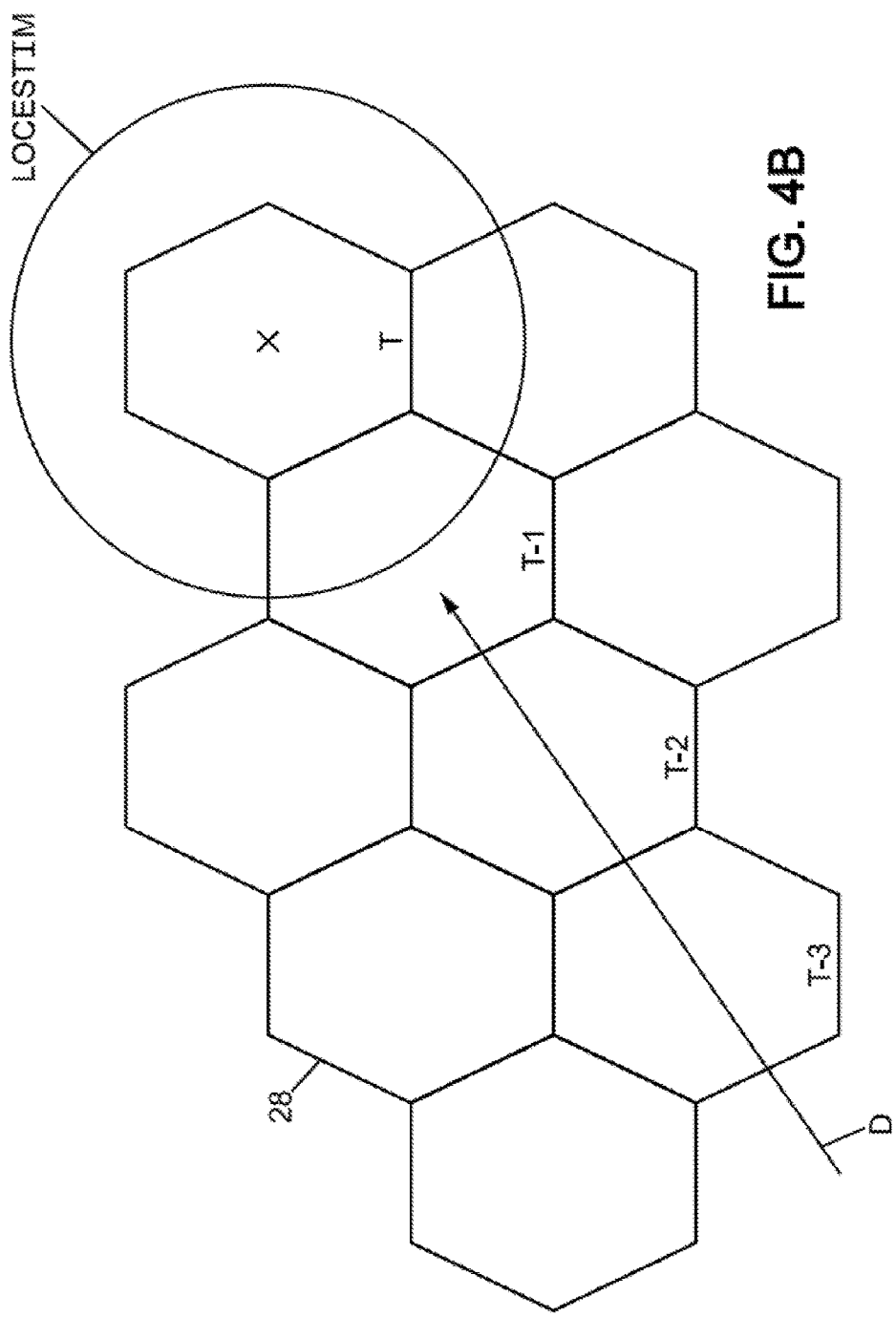

METHOD FOR LOCATING A TERMINAL CONNECTED TO A CELLULAR TELECOMMUNICATIONS NETWORK

CROSS-REFERENCE TO RELATED PATENT APPLICATION

This application claims the benefit of French Patent Application No. 14 63338, filed on Dec. 24, 2014, in the French Institute of Industrial Property, the entire content of which is incorporated herein by reference.

BACKGROUND

The present invention relates to the field of locating terminals connected to a cellular telecommunications network. It particularly relates to a locating method which makes use of a history of cells visited by a terminal.

This method is particularly advantageous in the case of terminals with a UICC card ("Universal Integrated Circuit Card") which stores this history.

"UICC card" is understood to mean any card comprising a microcontroller and memory. It can be used in mobile phones to store information specific to the subscriber to a mobile network. The ETSI TR 102 216 standard specifies the details of such a UICC card. A UICC card may comprise a SIM ("Subscriber Identity Module"), USIM ("Universal Subscriber Identity Module"), or ISIM ("IP Multimedia Services Identity Module") application.

The term "cell" is understood to mean a geographical area covered by at least one antenna of a network, for example for mobile telephony. Typically, a cell is covered by a base station which has at least one antenna to which terminals of said network are connected. The network is, for example, a GSM ("Global System for Mobile communications") mobile network, or UMTS ("Universal Mobile Telecommunications System"), or LTE ("Long Term Evolution").

With the proliferation of terminals equipped with dedicated GPS ("Global Positioning System") location systems, these terminals are now quite common; however, there are still many applications where it is not relevant to integrate such dedicated systems into the terminals. Payment terminals, low-cost mobile phones, a smart card comprising a UICC card, or various other connected devices are connected to a cellular telecommunications network but do not have components dedicated specifically to determining their location, particularly due to the size and cost of such components.

The ability to locate a terminal remains a very popular option, however, regardless of the intended application of the terminal. Typically, this option can help find a mislaid device. In addition, a cellular network operator may wish real-time knowledge of the geographical distribution of the various terminals connected to its network. This can, for example, allow it to dynamically calibrate the network equipment it manages in order to accommodate variations in the network load within a given territory.

Some network parameters available in a terminal can be used to locate the terminal. Typically, the identifier of the cell where the terminal is located is accessible in a terminal connected to a cellular network and can be used to locate the terminal.

In particular, when the terminal moves from one cell to a neighboring cell, the identifier of the new cell is quickly available at the terminal. The term "handover" is used for the transfer between cells when the terminal moves from one cell to another, whether or not a communication is in progress during the transfer.

Typically, the identifier of the cell is sent in "broadcast" mode, by the base station covering the cell. The channels used for transmission of this identifier are SCH-type synchronization channels. P-SCH (Primary Synchronization Channel) or S-SCH (Secondary Synchronization Channel) channels are typically used to send the cell identifier in a UMTS network.

The cell in which the terminal is located at a certain moment is called the "current cell".

The terminal can then retrieve location coordinates of this current cell using the cell identifier. To do this, it sends a request containing the identifier of the current cell to a server hosting a repository of cell identifiers. This repository of cell identifiers stores location coordinates for each cell identifier. A response to the request is then returned from the server to the terminal, containing the location coordinates for the current cell.

From these location coordinates of the cell, the terminal can determine its approximate location. Typically, the terminal determines that it is located in the vicinity of the location coordinates of the current cell. These location coordinates of the current cell frequently correspond to the location coordinates of the base station covering the current cell.

However, this solution is not satisfactory in terms of reliability. In many situations detailed below, it is impossible to retrieve the location coordinates of the current cell.

It is, for example, possible that the repository of cell identifiers has not been updated with the identifiers of all cells in the network. As new base stations are deployed in the network, many new cells are created and the repository is not updated in real time.

It is also possible for a mobile antenna to be deployed to cover an exceptional event. This event-specific mobile antenna serves as a temporary base station. However, the mobility of this temporary base station makes it impossible to keep the repository updated with the location coordinates for the identifier associated with this temporary base station. The cell identifier transmitted by this event-specific mobile antenna may therefore not be associated with location coordinates that actually correspond to the temporary location of the antenna.

The terminal may also have problems retrieving the identifier of the current cell. This situation can occur, for example, when the quality of service (QoS) of the transmission between the terminal and the base station covering the current cell is very poor, and in particular the transmission through the P-SCH and S-SCH channels in the case of a UMTS network. In this situation, it is possible that the frames sent by the base station to the terminal and containing the identifier of the current cell are not properly transmitted and therefore cannot be decoded by the terminal.

In these situations where it is impossible to retrieve location coordinates for the current cell, no location information is available. No terminal location information can therefore be provided to a user. Thus, at a given moment, if the location coordinates for the current cell are not available, the user does not have access to any location information.

SUMMARY

The present invention improves the situation.

To this end, a first aspect of the invention relates to a method for locating a terminal equipped with a UICC card, connected to a cellular telecommunications network and located in a current cell, the terminal storing in the UICC card an identifier of the current cell and at least one identifier of a previous cell in which the terminal was previously located. This method comprises the following steps, implemented by a processing server connected to said network:

receiving said identifiers received from the terminal via the communication network;

estimating location information for the terminal using location coordinates associated with at least one previous cell identified by an identifier stored in the terminal.

It is therefore possible to estimate location information for the terminal even if the location coordinates of the current cell are not available. Indeed, as the UICC card has stored the cell identifiers of previous cells, these identifiers are always available. They can therefore be used to estimate location information for the terminal.

Storage of these identifiers in the UICC card may be required for the implementation of other applications, such as applications relating to network monitoring. The use of data stored in the UICC card for the estimation is therefore completely transparent to the terminal activity, as these identifiers are being acquired and stored on the UICC card anyway. The impact on the operation of the terminal when the present invention is implemented, in particular in terms of processing power and storage capacities, is therefore very low.

Furthermore, the estimation of location information substantially increases the quality of service perceived by the user. Indeed, the user can be located at any given time, even if the location coordinates of the current cell are not available.

For example, a terminal user traveling by train from Paris to Munich may want to know where he is located at time t within the six hours that the journey lasts. If, at time t, it is not possible to obtain the coordinates of the current cell, the user may be located at any point between Paris and Munich. However, at time t, the user has already traveled through many cells, and this can be used to estimate location information. Thus, by estimating information from the identifier of at least one previous cell stored in the UICC card of his terminal, the user can obtain an idea of his location between Paris and Munich by consulting this information.

Note that in the context of the invention, a terminal equipped with a UICC card may be a cellular communication terminal such as a telephone (3G, UMTS, LTE, etc.), but could simply be equipment provided with a UICC card, for example in the form of an electronic tag primarily intended for remotely monitoring the equipment. Such equipment could be suitcases for example (to allow monitoring luggage transport in an airport) or various types of sensors to be managed remotely. The invention therefore concerns geolocation applications of telecommunications terminals but also applications for the remote monitoring or management of various non-telephony devices (machine-to-machine communication applications—M2M).

In this context, a user of the locating method according to the invention may be in particular a user of a cellular telephone terminal or an employee of a company handling remote monitoring/management of a set of objects/devices which are each equipped with a UICC card, using information provided by a processing server according to the invention.

In one embodiment, the location information is estimated based on location coordinates associated with the last cell in which the terminal was located. Thus, an estimate of the location of the terminal is very easily available even when the coordinates of the current cell are not available.

In another embodiment, the estimation of the location information comprises the sub-steps of:

determining a path of travel of the terminal based on location coordinates associated with at least two cells in which the terminal was previously located;

estimating the location information based on the determined path.

The term "path of travel of the terminal" is understood to mean the path obtained by connecting the geographical positions determined from the identifiers of the cells successively traversed by the terminal. Several geometric models can be used to establish the path of travel of a terminal through the cells.

One example of a geometric model is a straight line. If the movement of the terminal is linear, the path followed by the terminal is a straight line and the estimated location information is then located in the vicinity of this straight line.

Another example of a geometric model is that of a curve. Other examples of ways to calculate the path of travel of the terminal are given below.

The accuracy of the estimated location information is thus improved. Indeed, as explained in detail below, it is relevant to consider that the path of the terminal remains constant as it travels from the last visited cell to the current cell. Areas that are not consistent with the path of travel are thus set aside and the estimated location information is more accurate.

In one embodiment, the path of the terminal is determined using a geometric model established from the location coordinates associated with at least three previous cells. The estimated location information then comprises a set of location coordinates for the terminal, corresponding to geographical positions spread over an area which is dependent on the deviation between the location coordinates associated with the three previous cells and the geometric model considered.

"Spread between the set of estimated location coordinates for the terminal" is understood to mean the size of the surface area of the geographical area containing all considered positions. The location coordinates of a terminal are considered to be spread apart when the surface area of the corresponding area is large, and are not spread apart when said surface area is smaller.

The deviation between the location coordinates associated with the three previous cells and the geometric model is indicative of the reliability of the location information estimate. Depending on the case, this deviation may correspond to an average distance between the location coordinates associated with the three previous cells and the location coordinates calculated based on the geometric model concerned, or to a percentage of non-compliant location coordinates of the geometric model, or to any other manner of estimating the relevance of the geometric model used for comparison to the location coordinates obtained from the cell identifiers.

By making the reliability of the estimate dependent on a spread characteristic of the location coordinates, the probability is maximized that the terminal is located at a position which actually corresponds to the location information. In addition, a user of the method according to the invention can quickly and easily find out whether the location information provided is accurate (typically displaying a circle whose radius varies depending on the spread of the location coordinates).

In another embodiment, the location information is further estimated using a measurement of the time between two successive cell changes of the terminal. Taking this time into account makes it possible to improve the accuracy of estimated location information.

In one embodiment, between the receiving step and the estimating step, the method comprises the further steps of:
Sending, to a repository of cell identifiers, a request to obtain location coordinates associated with the current cell and location coordinates associated with the previous cell, the request comprising the identifier of the current cell and the identifier of the previous cell;
receiving a response to the request, the response containing the location coordinates associated with the current cell and the location coordinates associated with the previous cell. The location information is then estimated from the location coordinates associated with the previous cell.

It is thus possible to offload the management of cell-related data and therefore to use databases that can identify data relating to cells around the entire world, for example.

In another embodiment, the method further comprises a step of updating a repository of cell identifiers by adding the identifier of the current cell if this identifier is unknown to the repository. The simple act of transmitting a cell identifier to the repository establishes that the cell exists and is active. The repository is dynamically updated and is thus informed in real time of the appearance of new cells.

In one embodiment, the method further comprises the steps of:
determining theoretical location information using the identifier of the current cell, the location information being determined using the location coordinates associated with the current cell, the coordinates being read from a repository of cell identifiers;
detecting a location error if the estimated location information and the theoretical location information differ.

The location information determined from the identifier of the current cell, here the "theoretical location information", may be wrong. Such errors can be introduced by a renumbering of cell identifiers or more generally by an obsolete repository of cell identifiers. To check the relevance of this information, it is possible to compare it with location information that is estimated based on at least one previous cell identifier.

The user is thus no longer presented with location information that is completely inconsistent with the actual position of the terminal. The quality perceived by the user is therefore significantly improved.

For example, when cell identifiers are renumbered, the first location information determined using the identifier of the current cell may not match the location where the terminal actually is. However, by comparing this information to second location information estimated using the identifier of a previous cell, it is immediately detected that the theoretical location information is wrong.

In particular, in the case of a renumbering it is possible that the estimated location information is also erroneous. However, it is very unlikely that both errors occur together with both items of location information corresponding to similar geographical locations.

In addition, in the case where a location error is detected, the method may further comprise a step of updating the repository of cell identifiers using the estimated location information.

The repository is thus corrected in real time. The method makes it possible to detect location errors, and corrects the repository so that such errors are not reproduced, particularly for terminals that do not utilize an error detection process.

In one embodiment, the method further comprises, after the estimating step, a step of transmitting the location information to the terminal. Thus, a terminal user can access the estimated location information.

A second aspect of the invention concerns a computer program comprising instructions for implementing the method according to the first aspect of the invention, when these instructions are executed by a processor.

A third aspect of the invention relates to a processing server connected to a cellular telecommunications network, for determining the location of at least one terminal equipped with a UICC card and located in a current cell, the terminal storing in the UICC card an identifier of the current cell and at least one identifier of a previous cell in which the terminal was previously located. According to the invention, said server comprises at least one processor configured to perform the operations of:
receiving identifiers received from the terminal via the communication network;
estimating the location information of the terminal using location coordinates associated with at least one previous cell identified by an identifier stored in the terminal.

A fourth aspect of the invention relates to a storage server comprising a repository of cell identifiers, connected by a communications network to the processing server according to the third aspect of the invention, comprising a processor arranged to perform the operations of:
receiving a request to obtain location coordinates associated with the current cell and location coordinates associated with the previous cell, the request containing the identifier of the current cell and the identifier of the previous cell;
sending a response to the request, the response containing the location coordinates associated with the current cell and the location coordinates associated with the previous cell, the location information being estimated using the location coordinates associated with the previous cell.

A fifth aspect of the invention relates to a locating device comprised in a terminal equipped with a UICC card, connected to a cellular telecommunications network and located in a current cell, the terminal storing in the UICC card an identifier of the current cell and at least one identifier of a previous cell in which the terminal was previously located. According to the invention, the locating device comprises a microcontroller configured to carry out the steps of:
receiving said identifiers received from the terminal via the communication network;
estimating location information for the terminal using location coordinates associated with at least one previous cell identified by an identifier stored in the terminal.

The advantages provided by a computer program, a processing server, a storage server, and a location device, according to the invention, are identical to those disclosed above in relation to the method for locating a terminal according to the invention, and will therefore not be repeated here.

BRIEF DESCRIPTION OF THE DRAWINGS

Other features and advantages of the invention will be apparent from the following detailed description and the accompanying drawings in which:

FIG. 4A is a diagram showing a set of cells in which the terminal is located, according to a first embodiment of the invention;

FIG. 4B is a diagram showing a set of cells in which the terminal is located, according to a second embodiment of the invention;

DETAILED DESCRIPTION

Figure 1:
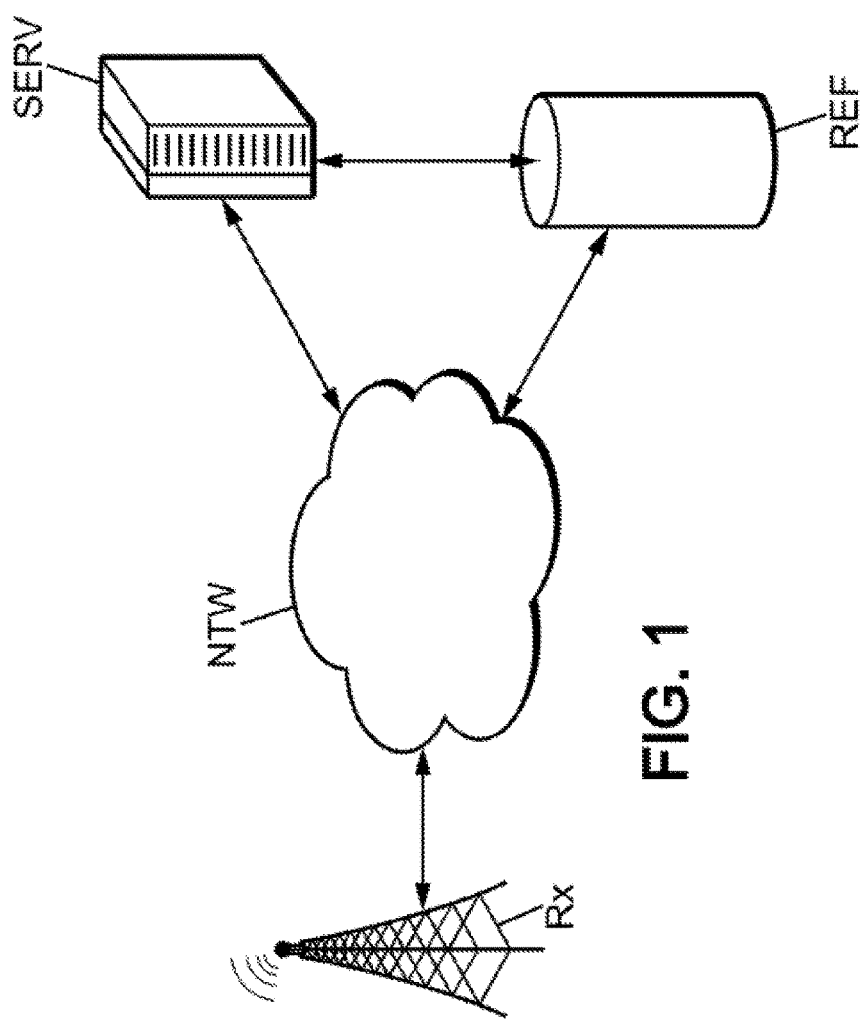
FIG. 1 illustrates a context for the implementation of the invention, according to one embodiment.

FIG. 1 details the various devices involved when the invention is implemented. In this figure, a terminal UE is connected to a network NTW via an antenna Rx. The antenna Rx is typically in a base station that covers a cell. As mentioned above, the network NTW can be a GSM, UMTS, or LTE network. A processing server SERV is connected to the network NTW and to a storage server containing a repository REF of cell identifiers.

The invention is described below in a non-limiting application to a situation where the locating method is implemented on the server SERV. The locating method, and in particular the steps of estimating the location information, could also be implemented in the terminal, in the base station, or in any device connected to the network NTW.

Figure 2:
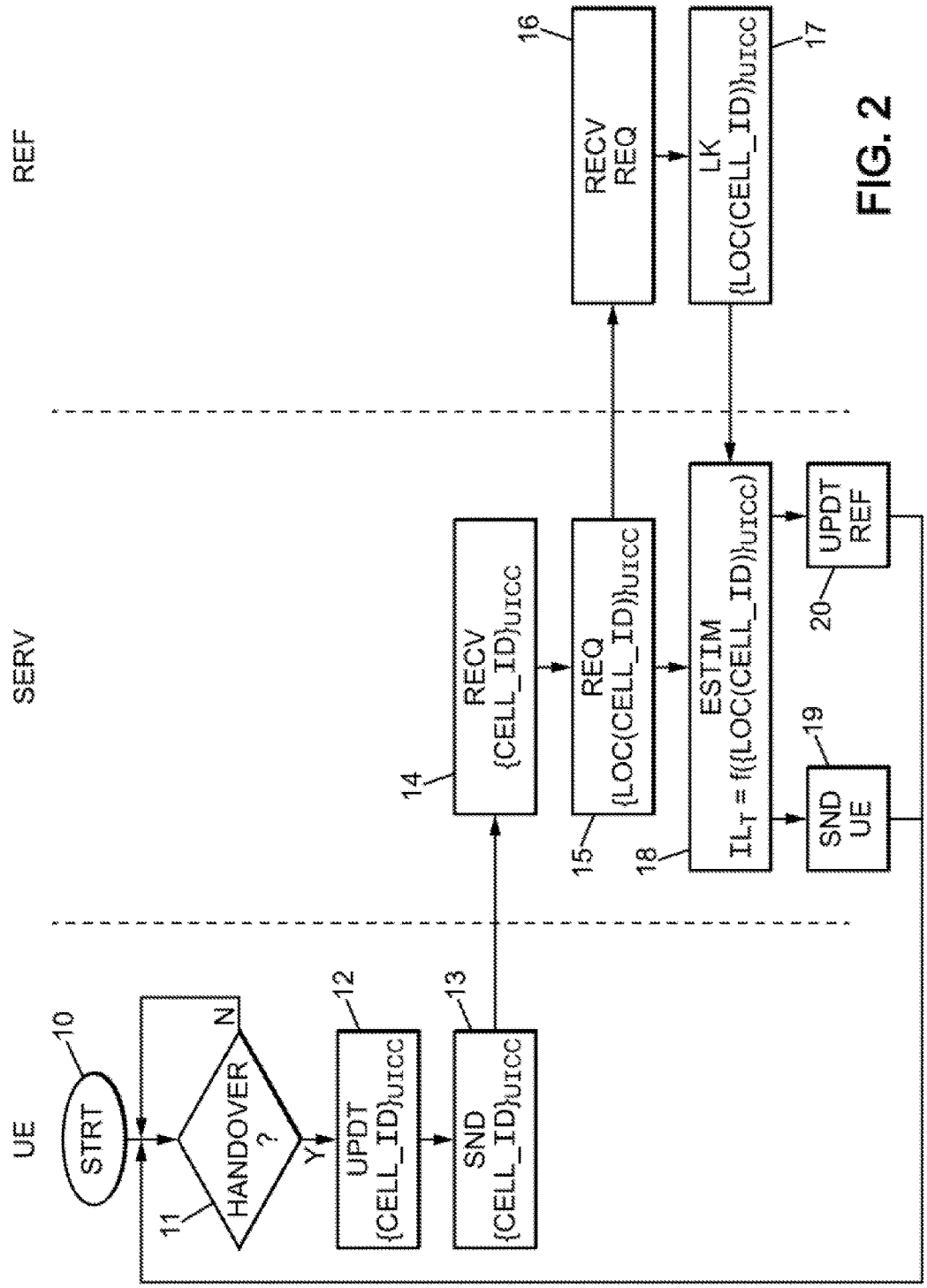
FIG. 2 is a diagram illustrating the steps of a location determination method, according to one embodiment of the invention.

FIG. 2 details the steps implemented by the locating method according to one embodiment.

The method starts in a step 10, and then the terminal UE detects, during a test 11, whether the terminal is changing cells.

If a cell change is detected (Y), a new cell identifier is received from the base station covering the new cell, here called the current cell. As explained above, the cell identifier is typically broadcast on a synchronization channel by the base station that covers the cell. This cell identifier is then stored in the UICC card of the terminal, in step 12.

The UICC card contains the identifiers of several previous cells, for example three. When the value of the current cell is updated in the UICC card in step 12, the identifier of the oldest previous cell is removed.

In step 13, the cell identifiers $\{CELL\_ID\}_{UICC}$ stored on the UICC card are transmitted to the server SERV. These data may be transmitted using the network NTW or via the Internet, typically when the terminal UE is connected to the Internet by an Ethernet cable or a Wi-Fi connection.

In step 14, the identifiers $\{CELL\_ID\}_{UICC}$ are received by the processing server SERV. A request to obtain the location coordinates $\{LOC(CELL\_ID)\}_{UICC}$ linked to the identifiers $\{CELL\_ID\}_{UICC}$ is then sent, in a step 15, to the repository REF of cell identifiers. The location coordinates $\{LOC(CELL\_ID)\}_{UICC}$ correspond to the location coordinates associated with the current cell and to the location coordinates associated with the previous cells whose identifier CELL_ID has been stored in the UICC card. The request contains the identifier $CELL\_ID_T$ of the current cell and the identifiers $CELL\_ID_{T-1}$; $CELL\_ID_{T-2}$; $CELL\_ID_{T-3}$ of the previous cells whose identifier has been stored in the UICC card.

In step 16, the request is received by the repository REF and the location coordinates $\{LOC(CELL\_ID)\}_{UICC}$ are extracted from the repository before being sent to the server SERV in a step 17. The mere fact of sending a cell identifier to the repository establishes that this cell exists and is active. The repository is therefore dynamically updated in real time to reflect the appearance of new cells.

The location information $IL_T$ of the terminal is then estimated in the server SERV in step 18. The details of this step are given below with reference to FIG. 3. The location information $IL_T$ is then sent to the terminal UE in step 19 and/or is sent, in step 20, to the repository REF for updating the repository. The repository is therefore corrected in real time. The disclosed method thus makes it possible to detect location errors and corrects the repository so that such errors are not reproduced, particularly for terminals that do not implement an error detection method.

This location information corresponds to an area where the terminal is estimated to be located. It can take different forms. It may be location coordinates, references which are associated with geographical positions, etc. The location information may also include additional information relating to the presence of the terminal in the area, for example the transmission power of the terminal antennas, the frequency used by the terminal, the fact that the terminal is roaming, etc.

As a variant, steps 14, 15, 18, 19, and 20 are directly implemented by the terminal UE.

Figure 3:
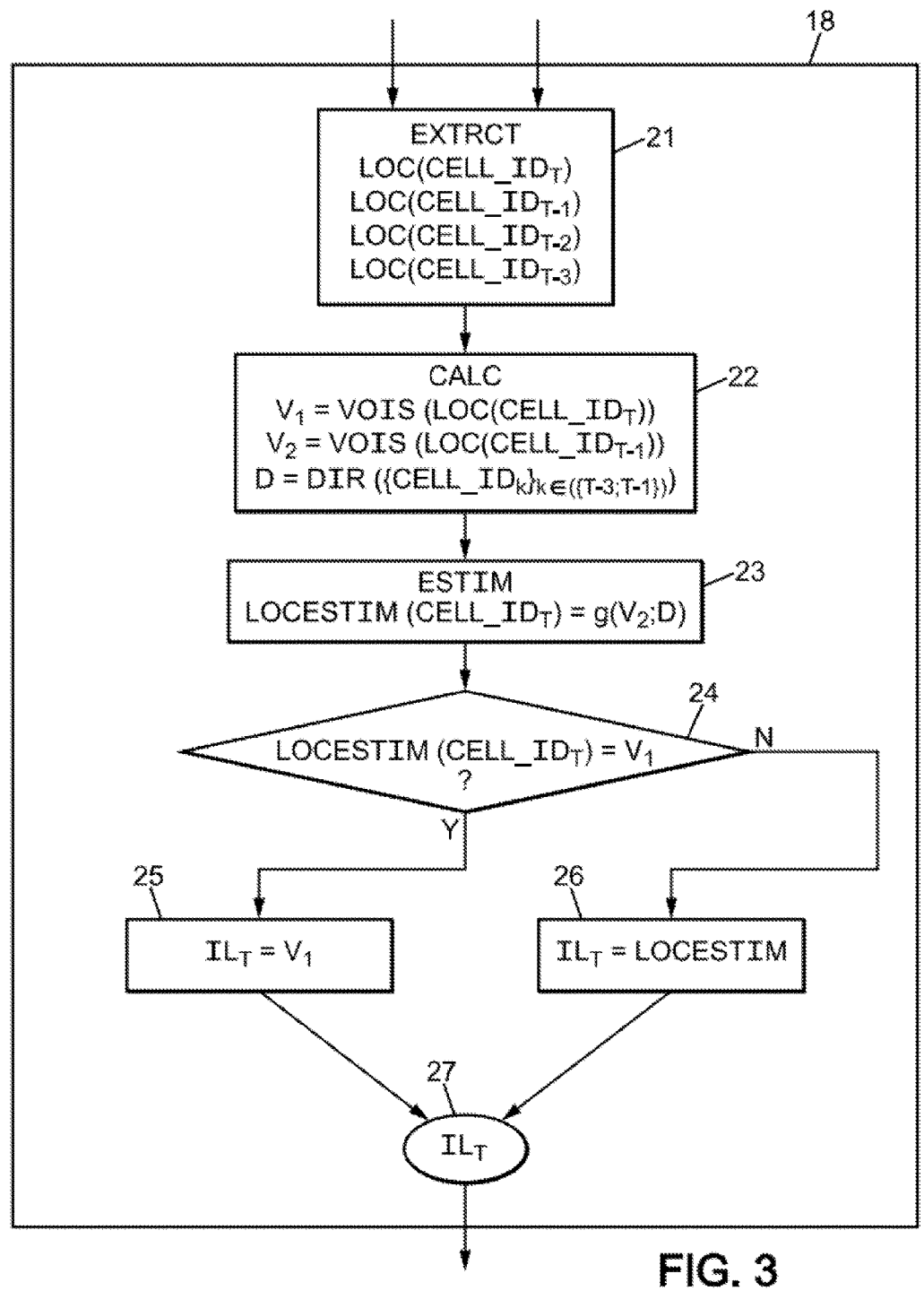
FIG. 3 is a diagram illustrating the steps of estimating location information, according to one embodiment of the invention.

FIG. 3 shows the steps taken to estimate the location information $IL_T$ in step 18. FIG. 3 is described here in conjunction with FIGS. 4A and 4B which represent a set of cells 28 covered by the network NTW. We distinguish in particular cells T-3, T-2, T-1, and T, which in this embodiment are the cells the terminal UE travels through (in order: T-3 then T-2 then T-1 then T). Cell T therefore corresponds to the current cell, cell T-1 is the previous cell in which the terminal was located before being in the current cell, etc.

The location coordinates $\{LOC(CELL\_ID)\}_{UICC}$ are received at the server SERV, originating from the repository REF, and the cell identifiers $\{CELL\_ID\}_{UICC}$ are received from the repository REF and/or are already present in the server SERV after the receiving step 14. In step 21, the location coordinates $LOC(CELL\_ID_T)$ of the current cell T, the location coordinates $LOC(CELL\_ID_{T-1})$ of the last cell T-1, and the location coordinates $LOC(CELL\_ID_{T-2})$, $LOC(CELL\_ID_{T-3})$ of cells T-2 and T-3 are extracted.

In step 22, the geographical areas $V_1$ and $V_2$ as well as the path D are calculated.

$V_1$ corresponds to the geographical area covered by the current cell. The location information associated with $V_1$ corresponds directly to $LOC(CELL\_ID_T)$, in other words to the location coordinates obtained from the repository REF after sending identifier $CELL\_ID_T$.

The area $V_1$ therefore directly provides location information for the terminal, since $V_1$ corresponds to the location of the current cell in which the terminal is located. However, it is possible for the area $V_1$ to be wrong, typically because the repository REF is not up to date for the identifier $CELL\_ID_T$ of the current cell.

In FIG. 4A, the area $V_1$ is represented in a situation where the location coordinates sent by the repository REF for identifier $CELL\_ID_T$ are correct. In the situation where these coordinates $LOC(CELL\_ID_T)$ are inaccurate, $V_1$ could be represented anywhere on the Earth's surface covered by the network NTW.

$V_2$ corresponds to a geographical area where it is estimated, solely from the location coordinates of T-1, that the terminal may be found. This area corresponds to a circle having a center C and a radius R:

C may be located at the center of cell T-1, at the base station covering cell T-1, or at an antenna covering at least a portion of cell T-1;

R may be defined such that $R=R_{CELL}+D_{CELL}$ where $R_{CELL}$ is the mean radius of a cell and $D_{CELL}$ is the mean diameter of a cell. R may also be defined such that $R=2D_{CELL}$.

As the terminal must by necessity have traveled from cell T-1 to a cell adjacent to cell T-1, the terminal must inevitably be located in $V_2$.

In a first embodiment described here with reference to FIG. 4A, the location information corresponds to $V_2$. The location information is therefore directly estimated from location coordinates $LOC(CELL\_ID)_{T-1}$ in this first embodiment.

In FIG. 4B, arrow D corresponds to a path of travel of the terminal which is obtained based on the location coordinates LOC(CELL LOC(CELL_ID$_{T-2}$), and LOC(CELL_ID$_{T-3}$) respectively associated with cells T-1, T-2, and T-3. The path D may be calculated in various ways.

One way is to find a geometric model that can approximate the path of the terminal in the cell plane (this plane corresponds to the surface of the Earth). Typically, to find this geometric model, several known geometric models are compared to the location coordinates of the previous cells. The more cells we have with known location coordinates, the more accurate the results given by the selected geometric model, in other words the closer it approaches the path actually followed by the terminal.

One example for the geometric model is a straight line. If the movement of the terminal is linear, the path followed by the terminal is a straight line and the estimated location information is then within the vicinity of this straight line. This example is represented in FIG. 4B where analysis of the location coordinates of the cells T-1, T-2, and T-3 visited by the terminal indicates that the path followed by the terminal is a straight line.

Another example of a geometric model is that of a curve.

A second way of determining a path of travel of the terminal is to take into account the context data in order to build a contextual model of the terminal movement.

A typical example of a contextual model is one that takes into account map data integrating the various transportation routes (roads, railways, inland waterways, etc.) or maritime or terrain characteristics (rivers without bridges, mountain range, lake, ocean, etc.). In this situation, one can estimate that the movement of the terminal is dictated by these topographical features. For example, it is logical that the terminal will not travel towards a cell that is not on the road followed by the terminal user or that the terminal will not travel into a mountain area which is inaccessible by train.

Another example of a contextual model is one that takes into account statistical data specific to the terminal user. Such statistics may concern the user's usual travel behavior (public transport, walking, etc.), physical characteristics of the user (disabled, very athletic person, etc.), or social life of the user (locations where the user's friends live, the user's residence, the user's workplace, etc.).

These two ways of determining a path of travel of the terminal may be combined, typically weighting the geometric model with contextual data. It is also possible to take into account technological data relating to the network NTW, for example. In many situations, networks of different types overlap, and cross-checking data between different types of networks may, for example, allow refining a geometric model established to model the movement of the terminal.

In step 23, the path D, which is therefore established at least using the location coordinates of cells previously visited by the terminal, is then used to estimate the location LOCESTIM of the terminal. This estimate is a function (function "g") of the path D and of the area $V_2$ where it is estimated that the terminal may be located.

For example, in FIG. 4B, by cross-checking the data relating to the path D of the terminal and the data relating to the last visited cell, it is estimated that the terminal is located in the geographical area LOCESTIM. This area LOCESTIM is more accurate than area $V_2$ (FIG. 4A).

In a second embodiment, with reference to FIG. 4B, the location information corresponds to the set of location coordinates which allow defining the area LOCESTIM.

Calculation of the area LOCESTIM may also take into account the amount of time between two successive cell changes. The time between the change from cell T-2 to T-1 and the change from cell T-1 to T can be measured.

By calculating the distance traveled between the moment when the cell change is detected and the moment when the location information is sent to the terminal (step 19, FIG. 2, described below) it is possible to refine the estimated position of the terminal. This distance is determined by a calculation such as: distance=speed×time. The speed is determined based on the measured time between the two cell changes, if the average radius of a cell is known. Alternatively, if the speed is known, it is possible to calculate the radius of the previous cell T-1.

In a variant of this second embodiment, the size of the surface area (spread) covered by area LOCESTIM is dependent on the deviation between the location coordinates associated with the previous cells and the model selected for modeling the path D.

The deviation between the location coordinates associated with the previous cell and the geometric model is indicative of the reliability of the estimate of the location information. This deviation may correspond to:

an average distance between the location coordinates associated with the three previous cells and location coordinates calculated according to the geometric model;

a percentage of location coordinates that do not fit the geometric model.

However, one can use any other manner of estimating the relevance of the geometric model relative to the location coordinates obtained using cell identifiers.

In step 24, a test is performed to see whether the estimated location information associated with area LOCESTIM and the theoretical location information associated with area $V_1$ correspond to different geographical positions.

The two items of location information (estimated and theoretical) which are associated with the geographical areas (respectively LOCESTIM and $V_1$) correspond to different positions when the surface area of the intersection of the two regions is smaller than a threshold value. This threshold value is typically chosen to correspond to the average surface area of a cell.

If the geographical positions match, the theoretical location information associated with $V_1$ is considered to be accurate. This location information is then accepted, in step 25, as verified location information $IL_T$.

If the geographical positions differ, the theoretical location information associated with $V_1$ is erroneous location information. This location information is therefore not accepted. The estimated location information associated with LOCESTIM is therefore accepted, in step 26, as verified location information $IL_T$.

In another embodiment, in which the test step 24 and the acceptance steps 25 and 26 are not carried out, the retained location information $IL_T$ is directly the estimated location information associated with LOCESTIM.

Figure 5:
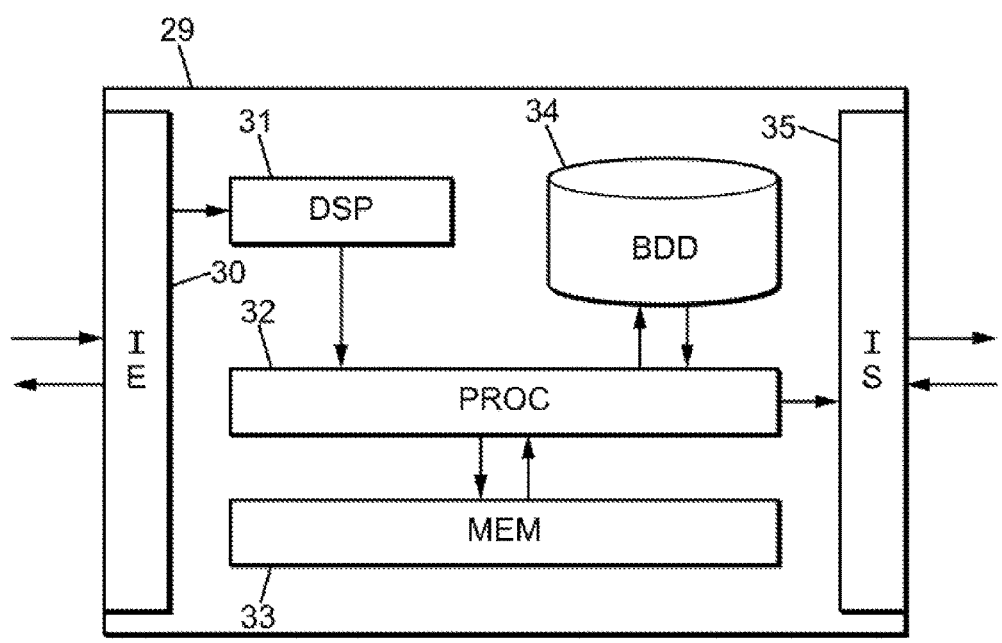
FIG. 5 illustrates a microcontroller, according to one embodiment of the invention.

FIG. 5 represents an exemplary device 29 for the implementation of some or all of the steps of the method described above. This device may, for example, be comprised in the processing server SERV or directly in the terminal UE, for carrying out steps 14, 15, 18, 19, and 20. This device 29 may take the form of a housing comprising printed circuit boards, any type of computer, or a mobile phone.

The device 29 comprises RAM 33 for storing instructions enabling a processor 32 to carry out the method for locating the terminal as described above. The device also comprises mass storage 34 for storing data to be kept after the method is carried out.

The device 29 may further comprise a digital signal processor (DSP) 31. This DSP 31 receives input data such as cell identifiers, and processes these data according to a method for locating a terminal according to the invention.

The device 29 also comprises an input interface 30 for receiving data comprised in the UICC card and an output interface 35 for transmitting the estimated and/or verified location information.

The invention is not limited to the embodiments described above as examples; it extends to other variants.

An embodiment was described above in which identifiers were transmitted by a radio frequency link. Of course, these transmissions may be made using any communication technique, such as optical or wired communication.

In addition, in the embodiment described above, a terminal (UE) located according to the method of the invention is equipped with a UICC card in which the terminal stores an identifier (CELL_ID$_T$) of the current cell and at least one identifier (CELL_ID$_{T-1}$; CELL_ID$_{T-2}$; CELL_ID$_{T-3}$) of a previous cell. However, according to other embodiments, it may be provided that the terminal uses a software and/or hardware module for storing said cell identifiers, referred to herein as a "security module", this security module being distinct from the UICC card.

Therefore, in general, a terminal located according to the locating method of the invention is equipped with a module that is hardware and/or software in nature, referred to herein as a "security module", in which the terminal stores cell identifiers, and depending on the embodiment chosen, such a security module may comprise a UICC card or be distinct from a UICC card, and in the latter case this module may then be configured to implement some or all of the functionality provided by a UICC card.

The invention claimed is:

1. A method for locating a terminal equipped with a security module, connected to a cellular telecommunications network and located in a current cell,
said terminal storing in said security module an identifier of the current cell and at least one identifier of a previous cell in which the terminal was previously located;
said method comprising the following steps, implemented by a processing server connected to said network:
receiving said identifiers received from the terminal via the communication network;
estimating location information for the terminal using location coordinates associated with at least one previous cell identified by an identifier stored in the terminal, wherein the location information is estimated based on location coordinates associated with a last cell in which the terminal was located, wherein the location information is estimated without the location coordinates of the current cell,
wherein estimating the location information comprises the sub-steps of:
determining a path of travel of the terminal using a geometric model established from the location coordinates associated with at least three previous cells, and
estimating the location information based on said path of travel, the estimated location information comprising a set of location coordinates for the terminal whose spread is dependent on an average distance between the location coordinates associated with the three previous cells and the location coordinates calculated based on the geometric model; and
updating a repository of cell identifiers that stores location coordinates for each cell identifier by adding the identifier of the current cell if this identifier is unknown to said repository.

2. The method for locating a terminal according to claim 1, wherein the security module is embedded in a UICC card comprised in said terminal.

3. The method for locating a terminal according to claim 1,
wherein the estimated location information comprises a set of location coordinates for the terminal whose spread is dependent on percentage of non-compliant location coordinates of the geometric model, or to any other manner of estimating the relevance of the geometric model used for comparison to the location coordinates obtained from the cell identifiers.

4. The method according to claim 1, wherein the location information is further estimated using a measurement of the time between two successive cell changes of the terminal.

5. The method according to claim 1, further comprising, between the receiving step and the estimating step, the steps of:
sending, to a repository of cell identifiers, a request to obtain location coordinates associated with the current cell and location coordinates associated with said at least one previous cell, said request comprising the identifier of the current cell and the identifier of said at least one previous cell;
receiving a response to said request, the response containing the location coordinates associated with the current cell and the location coordinates associated with said at least one previous cell, the location information being estimated from the location coordinates associated with said at least one previous cell.

6. The method according to claim 1, further comprising the steps of:
determining theoretical location information using the identifier of the current cell, the location information being determined using the location coordinates associated with the current cell, said coordinates being read from a repository of cell identifiers;
detecting a location error if the estimated location information and the theoretical location information correspond to different geographical positions.

7. The method according to claim 6, further comprising, in the case where a location error is detected, a step of updating the repository of cell identifiers using the estimated location information.

8. The method according to claim 1, further comprising, after the estimating step, a step of transmitting the location information to the terminal.

9. A non-transitory computer-readable storage medium with an executable program stored thereon, wherein the program instructs a microprocessor to perform the method according to claim 1.

10. A processing server connected to a cellular telecommunications network, for determining the location of at least one terminal equipped with a security module and located in a current cell, said terminal storing in said security module an identifier of the current cell and at least one identifier of a previous cell in which the terminal was previously located;

the server comprising at least one processor configured to perform the operations of:

receiving said identifiers received from the terminal via the communication network;

estimating the location information of the terminal using location coordinates associated with at least one previous cell identified by an identifier stored in the terminal, wherein the location information is estimated without the location coordinates of the current cell, wherein estimating the location information comprises the sub-steps of:

determining a path of travel of the terminal using a geometric model established from the location coordinates associated with at least three previous cells, and estimating the location information based on said path of travel, the estimated location information comprising a set of location coordinates for the terminal whose spread is dependent on an average distance between the location coordinates associated with the three previous cells and the location coordinates calculated based on the geometric model; and updating a repository of cell identifiers that stores location coordinates for each cell identifier by adding the identifier of the current cell if this identifier is unknown to said repository; wherein the location information is estimated based on location coordinates associated with a last cell in which the terminal was located.

11. A storage server comprising a repository of cell identifiers, connected by a communications network to the processing server according to claim 10, comprising a processor arranged to perform the operations of:

receiving a request to obtain location coordinates associated with the current cell and location coordinates associated with said at least one previous cell, said request containing the identifier of the current cell and the identifier of said at least one previous cell;

sending a response to said request, the response containing the location coordinates associated with the current cell and the location coordinates associated with said at least one previous cell, the location information being estimated using the location coordinates associated with said at least one previous cell; and updating the repository of cell identifiers that stores location coordinates for each cell identifier by adding the identifier of the current cell if this identifier is unknown to said repository.

12. A locating device comprised in a terminal equipped with a security module, connected to a cellular telecommunications network and located in a current cell, said terminal storing in said security module an identifier of the current cell and at least one identifier of a previous cell in which the terminal was previously located;

said device comprising a microcontroller configured to carry out the steps of:

receiving said identifiers received from the terminal via the communication network;

estimating location information for the terminal using location coordinates associated with at least one previous cell identified by an identifier stored in the terminal, wherein the location information is estimated based on location coordinates associated with the last cell in which the terminal was located, wherein the location information is estimated without the location coordinates of the current cell, wherein estimating the location information comprises the sub-steps of:

determining a path of travel of the terminal using a geometric model established from the location coordinates associated with at least three previous cells, and estimating the location information based on said path of travel, the estimated location information comprising a set of location coordinates for the terminal whose spread is dependent on an average distance between the location coordinates associated with the three previous cells and the location coordinates calculated based on the geometric model; and updating a repository of cell identifiers that stores location coordinates for each cell identifier by adding the identifier of the current cell if this identifier is unknown to said repository.

13. The device according to claim 12, wherein said security module is comprised in a UICC card of said terminal.

* * * * *